(12) United States Patent
Tanaka

(10) Patent No.: US 10,870,082 B2
(45) Date of Patent: Dec. 22, 2020

(54) DEVICE FOR TREATING EXHAUST GAS FROM ENGINE AND METHOD FOR MANUFACTURING SAID DEVICE

(71) Applicant: MAZDA MOTOR CORPORATION, Hiroshima (JP)

(72) Inventor: Eijiro Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/619,078

(22) PCT Filed: May 23, 2018

(86) PCT No.: PCT/JP2018/019879
§ 371 (c)(1),
(2) Date: Dec. 3, 2019

(87) PCT Pub. No.: WO2018/225514
PCT Pub. Date: Dec. 13, 2018

(65) Prior Publication Data
US 2020/0094188 A1    Mar. 26, 2020

(30) Foreign Application Priority Data

Jun. 5, 2017    (JP) .................................. 2017-110551

(51) Int. Cl.
*B01D 53/94*      (2006.01)
*B01D 46/24*      (2006.01)
(Continued)

(52) U.S. Cl.
CPC ....... *B01D 53/944* (2013.01); *B01D 46/2418* (2013.01); *B01J 23/63* (2013.01);
(Continued)

(58) Field of Classification Search
CPC ... F01N 13/10; F01N 13/1805; B01D 53/944; B01D 46/2418; B01J 37/0228
(Continued)

(56) References Cited

U.S. PATENT DOCUMENTS

2003/0224933 A1*  12/2003  Kondo ................. B01D 53/885
                                                            502/439
2006/0100101 A1    5/2006  Tsuji et al.
(Continued)

FOREIGN PATENT DOCUMENTS

DE    112015000166 T5    5/2016
EP         2236783 A1    10/2010
(Continued)

OTHER PUBLICATIONS

International Search Report issued in PCT/JP2018/019879; dated Jul. 24, 2018.

*Primary Examiner* — Tom P Duong
(74) *Attorney, Agent, or Firm* — Studebaker & Brackett PC

(57) ABSTRACT

A honeycomb-like porous filter for collecting PM in exhaust gas is provided in an exhaust gas passage of an engine. The exhaust gas flows from inflow side cells 12 of the filter through pores 16 of partition walls 15 of the filter to outflow side cells 13. A catalyst 17 is supported on surfaces of the partition walls 15 constituting the inflow side cells 12 and on inner surfaces of the pores 16 of the filter. The catalyst 17 is supported on the surfaces of the partition walls 15 more thickly than on the inner surfaces of the pores 16.

7 Claims, 7 Drawing Sheets

(51) Int. Cl.
*B01J 23/63* (2006.01)
*B01J 35/04* (2006.01)
*B01J 37/02* (2006.01)
*B01J 37/08* (2006.01)
*F01N 3/021* (2006.01)
*F01N 3/28* (2006.01)
*F01N 13/10* (2010.01)
*F01N 13/18* (2010.01)

(52) U.S. Cl.
CPC ........... *B01J 35/04* (2013.01); *B01J 37/0228* (2013.01); *B01J 37/0236* (2013.01); *B01J 37/0244* (2013.01); *B01J 37/08* (2013.01); *F01N 3/021* (2013.01); *F01N 3/2842* (2013.01); *F01N 13/10* (2013.01); *F01N 13/1805* (2013.01); *B01D 2255/1021* (2013.01); *B01D 2255/1023* (2013.01); *B01D 2255/1025* (2013.01); *B01D 2255/2063* (2013.01); *B01D 2255/407* (2013.01); *B01D 2255/908* (2013.01); *B01D 2255/9155* (2013.01); *B01D 2279/30* (2013.01); *F01N 2330/02* (2013.01); *F01N 2330/06* (2013.01); *F01N 2330/18* (2013.01); *F01N 2370/02* (2013.01)

(58) Field of Classification Search
USPC ......................................... 422/171, 177, 180
See application file for complete search history.

(56) References Cited

U.S. PATENT DOCUMENTS

| | | | |
|---|---|---|---|
| 2009/0324454 A1* | 12/2009 | Nakano | B01D 53/8668 422/177 |
| 2013/0149207 A1 | 6/2013 | Castagnola et al. | |
| 2015/0165423 A1* | 6/2015 | Sung | B01J 29/076 423/213.5 |
| 2016/0074800 A1 | 3/2016 | Ito et al. | |
| 2016/0138448 A1 | 5/2016 | Itoh et al. | |
| 2016/0222851 A1 | 8/2016 | Kawabata et al. | |
| 2016/0258330 A1 | 9/2016 | Yamada et al. | |
| 2017/0016366 A1 | 1/2017 | Suzawa et al. | |
| 2017/0095798 A1 | 4/2017 | Onoe et al. | |

FOREIGN PATENT DOCUMENTS

| | | |
|---|---|---|
| EP | 2269731 A1 | 1/2011 |
| JP | 2003211001 A | 7/2003 |
| JP | 2006136784 A | 6/2006 |
| JP | 2010221162 A | 10/2010 |
| JP | 2013220402 A | 10/2013 |
| JP | 2016-055282 A | 4/2016 |
| JP | 2016179451 A | 10/2016 |
| JP | 2017020442 A | 1/2017 |
| JP | 2017072033 A | 4/2017 |
| WO | 2009130869 A1 | 10/2009 |
| WO | 2015-059904 A1 | 4/2015 |

* cited by examiner

DEVICE FOR TREATING EXHAUST GAS FROM ENGINE AND METHOD FOR MANUFACTURING SAID DEVICE

BACKGROUND

The present invention relates to a device for treating exhaust gas from an engine and a method for manufacturing a device for treating exhaust gas from an engine.

BACKGROUND ART

Besides hydrocarbons (HC), carbon monoxide CO, and nitrogen oxides NOx, exhaust gas discharged from an engine includes particulate matter (Particulate Matter, hereinafter referred to as "PM") containing carbon as a major component. Since this PM is also responsible for air pollution, regulations on PM emissions have been strengthened along with regulations on emissions of harmful gas components such as HC, CO, and NOx.

Patent Document 1 describes that in order to avoid upsizing of a device for treating exhaust gas, by supporting a catalyst on a filter for collecting PM, PM is collected and exhaust gas is purified. The filter is of a honeycomb structure having opening cells which penetrate in an axial direction and closed cells whose upstream ends are closed and is formed of porous ceramics. In a portion of the honeycomb structure on a downstream side in an exhaust gas flow direction, the catalyst is supported on cell walls, and in a portion of the honeycomb structure on an upstream side therein, the catalyst is not supported on cell walls.

In the case of the above-mentioned filter, in the portion of the honeycomb structure on the upstream side, the exhaust gas flows from the opening cells through pores of the cell walls to the closed cells, such that the PM is collected in the pores, promoting purification of the exhaust gas by the catalyst supported on the cell walls on the downstream side of the honeycomb structure.

CITATION LIST

Patent Document

PATENT DOCUMENT 1: Japanese Unexamined Patent Publication No. 2017-20442

SUMMARY OF THE INVENTION

Technical Problem

In the case of Patent Document 1, in order to avoid an increase in ventilation resistance, the catalyst is not supported on the cell walls on the upstream side of the honeycomb structure. Therefore, the exhaust gas is not purified by the catalyst on this upstream side thereof. If in order to enhance purification performance of the exhaust gas, an amount of the catalyst supported on the downstream side of the honeycomb structure is increased, the pores of the cell walls on the downstream side are blocked by the catalyst, thereby increasing the ventilation resistance of the exhaust gas and reducing scavenging performance of an engine.

Therefore, an object of the present invention is to enhance purification performance of exhaust gas while reduction in scavenging performance of an engine is suppressed.

Solution to the Problem

In order to solve the above-mentioned problems, the present invention has been devised such that a catalyst is thickly supported on surfaces of a porous filter for collecting PM in exhaust gas and is thinly supported on inner surfaces of pores of the filter.

A device for treating exhaust gas from an engine disclosed herein includes a filter porous and provided in an exhaust gas passage of the engine and collecting the PM in exhaust gas, the exhaust gas passing through pores of the filter from surfaces of the filter and being discharged, a catalyst for purifying the exhaust gas being supported on the surfaces of the filter and inner surfaces of the pores, and the catalyst being supported on the surfaces of the filter more thickly than on the inner surfaces of the pores.

By employing this device for treating exhaust gas from an engine, since by thickly supporting the catalyst on the surfaces of the filter, a thickness of the catalyst supported on the inner surfaces thereof is made thin, it is made easy to ensure gas permeability of the pores while clogging of the pores due to the catalyst is avoided. In other words, it is made possible to prevent exhaust pressure loss due to the filter from being increased by supporting the catalyst on the filter, that is, to prevent scavenging efficiency in an exhaust stroke of the engine from being decreased.

Further, since the catalyst is thickly supported on the surfaces of the filter, purification of the exhaust gas easily proceeds. The exhaust gas whose temperature is increased due to reaction heat of the catalyst on the surfaces of the filter passes through the pores. Therefore, although the catalyst is thinly supported on the inner surfaces of the pores, due to the high temperature of the exhaust gas passing through the pores, the purification of the exhaust gas by the catalyst efficiently proceeds.

In one embodiment, an amount of the supported catalyst per unit area of the surfaces of the filter is 50 times or more and 500 times or less as much as an amount of the supported catalyst per unit area of the inner surfaces of the pores. Thus, the device for treating exhaust gas from an engine is further advantageous in enhancing purification performance of the exhaust gas while suppressing reduction in scavenging performance of the engine.

In one embodiment, a catalytic converter for purifying the exhaust gas is provided on an upstream side of the filter in the exhaust gas passage.

By employing the above-mentioned configuration, since the exhaust gas is purified also by the catalytic converter on the upstream side, an amount of the catalyst supported on the filter can be made small, thus leading to an advantage in suppressing an increase in exhaust pressure loss. Further, since the exhaust gas is purified by the catalytic converter on the upstream side and the catalyst of the filter, a capacity of the catalytic converter can also be suppressed to be low. In other words, according to the embodiment, it is made easy to ensure desired exhaust gas purification performance while upsizing of the device for treating exhaust gas from an engine as a whole and an increase in exhaust resistance thereof are suppressed.

In one embodiment, the catalytic converter includes a catalyst which exhibits activity in oxidation reaction of unsaturated hydrocarbons whose number of carbon atoms is 6 to 9 (hereinafter, referred to as "unsaturated high HC"), and the catalyst of the filter exhibits activity in oxidation reaction of saturated hydrocarbons whose number of carbon atoms is 5 or smaller (hereinafter, referred to as "saturated low HC").

It is known that the saturated hydrocarbons are less likely to be combustible (which are less likely to be oxidatively decomposed), as compared with the unsaturated hydrocarbons.

In the above-described embodiment, the unsaturated high HC in the exhaust gas is oxidized and purified by the catalyst of the catalytic converter on the upstream side, and a temperature of the exhaust gas is increased due to catalytic reaction heat. In accordance therewith, a temperature of the filter on a downstream side is increased. Therefore, although the saturated low HC in the exhaust gas is comparatively less likely to be combustible, since the temperature of the filter is increased as described above, the catalyst supported on this filter becomes efficiently active in purification of the saturated low HC. Thus, even when the temperature of the exhaust gas is relatively low, the unsaturated high HC and the saturated low HC are efficiently purified.

Further, saturated low HC are produced by cracking of the unsaturated high HC due to the catalyst of the catalytic converter, and the saturated low HC flows to the filter on the downstream side of the catalytic converter. Since the catalyst supported on the filter exhibits activity in purification of the unsaturated low HC, the saturated low HC produced by the cracking is also efficiently purified by the catalyst of the filter.

A method for manufacturing a device for treating exhaust gas from an engine disclosed herein includes: a first step of immersing a filter, which is porous, in first catalyst slurry in which a catalyst for purifying the exhaust gas is dispersed, and of supporting the catalyst on inner surfaces of the pores of the filter, the porous filter having pores through which the exhaust gas from the engine passes; a second step of immersing the filter having undergone the first step in second catalyst slurry in which the catalyst is dispersed and of supporting the catalyst on surfaces of the filter in a thickness greater than a thickness of the catalyst supported on the inner surfaces of the pores of the filter; and a third step of providing the filter having undergone the second step in an exhaust gas passage of the engine.

In this method, since supporting the catalyst on the inner surfaces of the pores of the filter and supporting the catalyst on the surfaces of the filter are conducted in separate steps and the catalyst is supported on the inner surfaces of the pores of the filter, it is made easy to support the catalyst on the surfaces of the filter more thickly than on the inner surfaces of the pores.

In one embodiment, components of the catalyst of the first catalyst slurry and components of the catalyst of the second catalyst slurry are same as each other.

In one embodiment, the method includes a step of drying the catalyst supported on the inner surfaces of the pores of the filter between the first step and the second step, and the method includes a step of calcining the catalyst supported on the surfaces of the filter and the catalyst supported on the inner surfaces of the pores between the second step and the third step.

Since the catalyst supported on the inner surfaces of the pores of the filter is dried, when the catalyst is supported on the surfaces of the filter in the second step, the catalyst on the inner surfaces of the pores is prevented from being lost.

Advantages of the Invention

According to the present invention, since the catalyst for purifying the exhaust gas is supported on the surfaces of the filter more thickly than on the inner surfaces of the pores of the filter, that is, since the catalyst is thinly supported on the inner surfaces of the filter, it is made possible to enhance purification performance of exhaust gas while reduction in scavenging performance of an engine is suppressed (while fuel consumption of the engine is enhanced).

DESCRIPTION OF EMBODIMENT

Hereinafter, an embodiment of the present invention will be described with reference to the accompanying drawings. The following description of the preferred embodiment is merely illustrative in nature and is not intended to limit the scope, applications, or uses of the present invention.

Device for Treating Exhaust Gas

Figure 1:
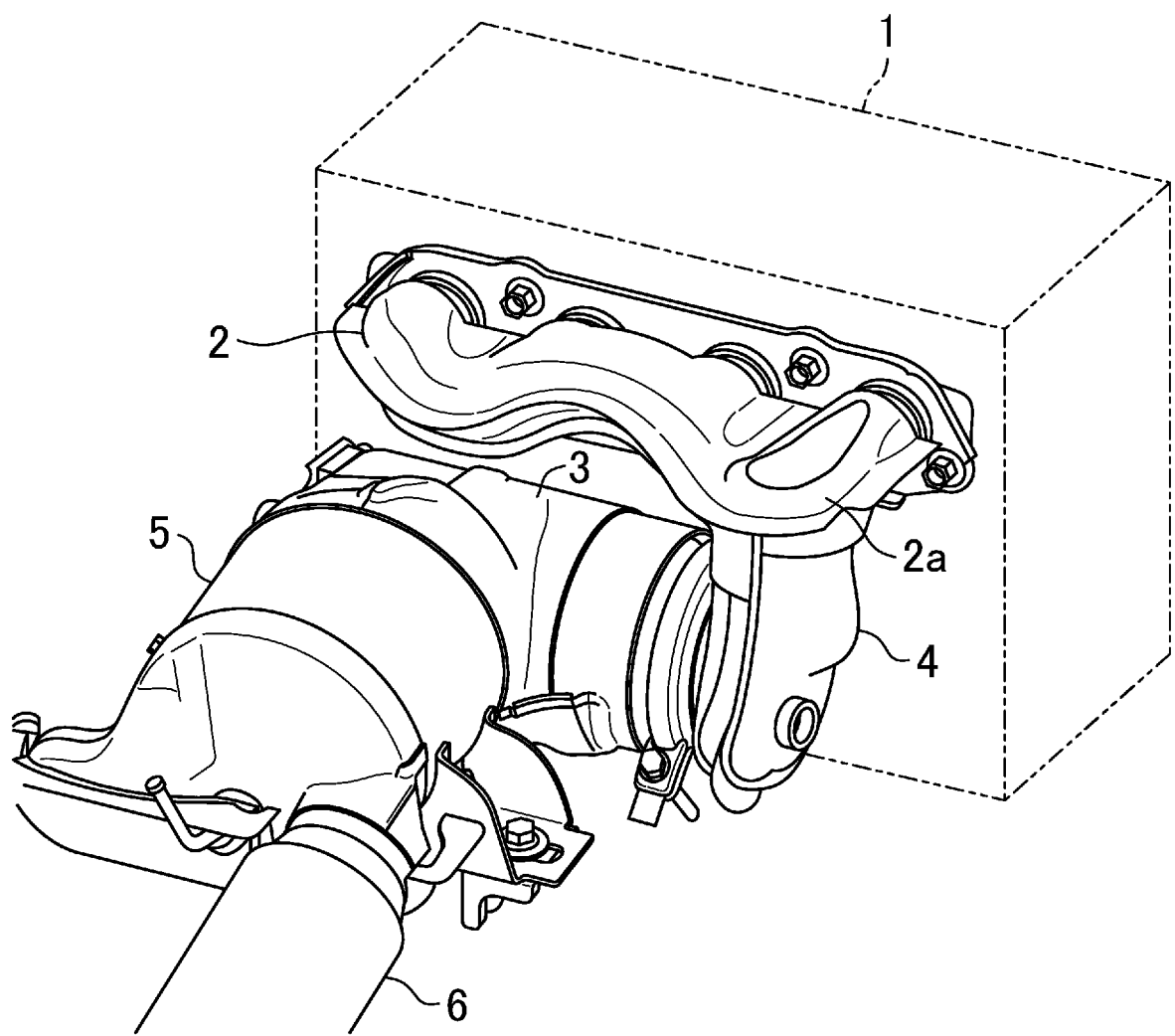
FIG. 1 is a perspective view illustrating a device for treating exhaust gas from an engine.

In FIG. 1, a reference numeral 1 denotes a direct injection gasoline engine of a motor vehicle, and a reference numeral 2 denotes an exhaust manifold of the engine 1. A catalytic converter 3 is coupled to a collecting part 2$a$ of the exhaust manifold 2 via a connecting pipe 4, and a GPF (gasoline particulate filter) device 5 is directly connected to a downstream side of the catalytic converter 3 in an exhaust flow direction. An exhaust pipe 6 extends from the GPF device 5 toward the rear of the motor vehicle.

Figure 2:
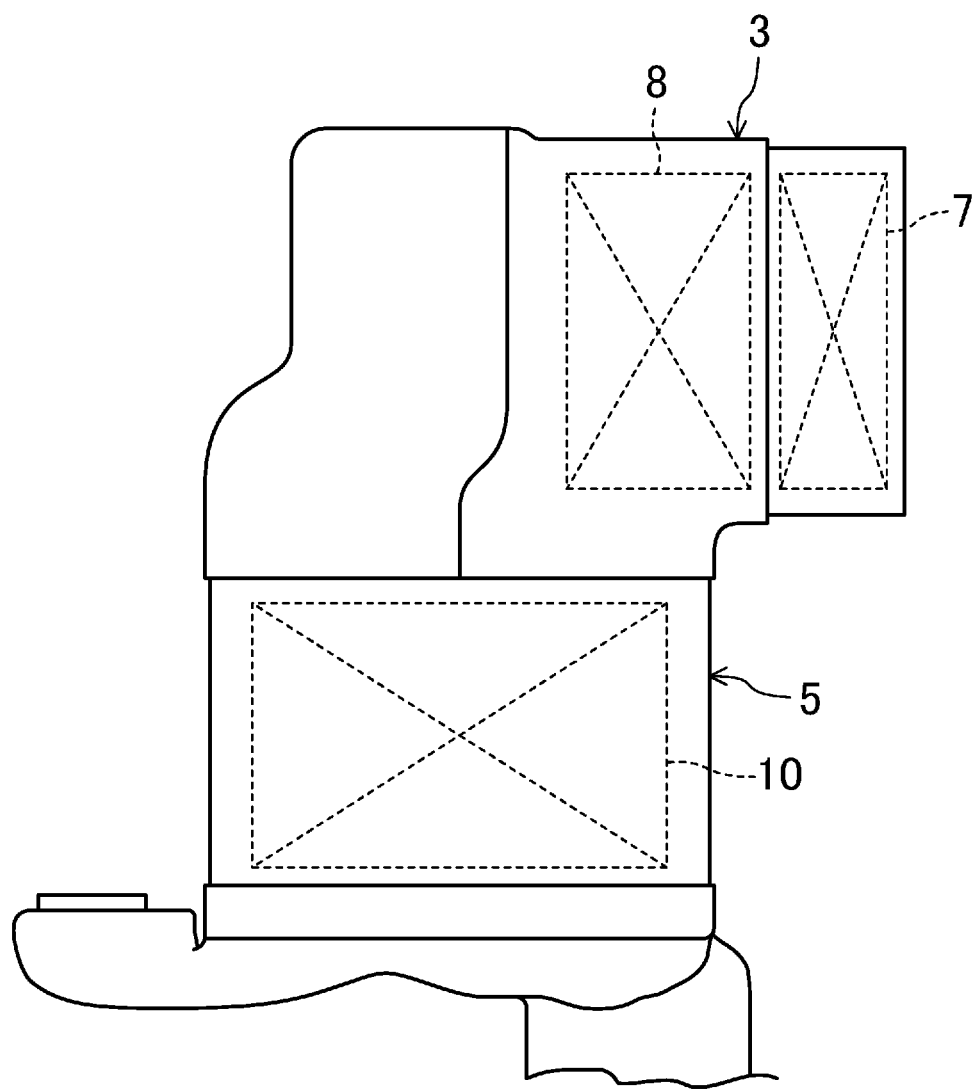
FIG. 2 is a plan view illustrating a main part of the device.

As shown in FIG. 2, the catalytic converter 3 is a two-bed type in which two honeycomb catalysts 7 and 8 on a front stage and a rear stage are arranged in series and housed in a catalyst container. The honeycomb catalyst 7 on the front stage is formed by supporting a first catalyst on a honeycomb carrier. The honeycomb catalyst 8 on the rear stage is formed by supporting a second catalyst on a honeycomb carrier. As each of the honeycomb carriers, it is preferable to use a honeycomb carrier having a capacity of approximately 0.5 L to 1.5 L.

The first catalyst exhibits activity on oxidation reaction of unsaturated high HC such as toluene at a temperature lower than that of the second catalyst. On the other hand, the second catalyst exhibits activity on oxidation reaction of saturated low HC such as isopentane at a temperature lower than that of the first catalyst.

Figure 3:
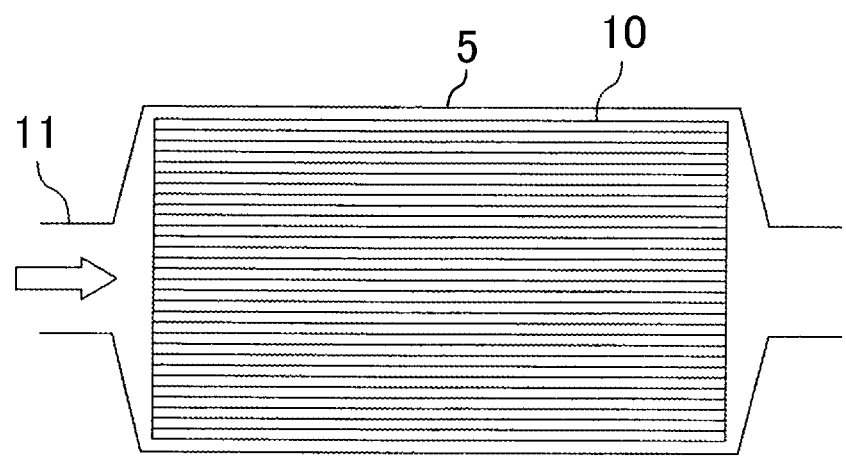
FIG. 3 is a diagram schematically illustrating a GPF device.
Figure 4:
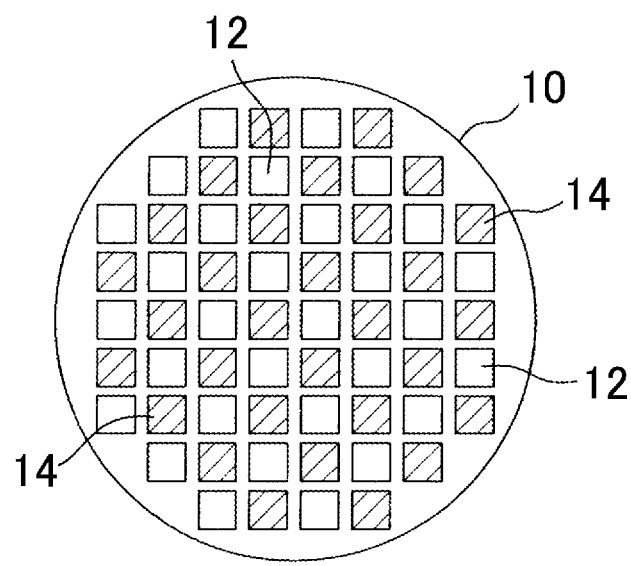
FIG. 4 is a front view schematically illustrating a filter with a catalyst in the GPF device.
Figure 5:
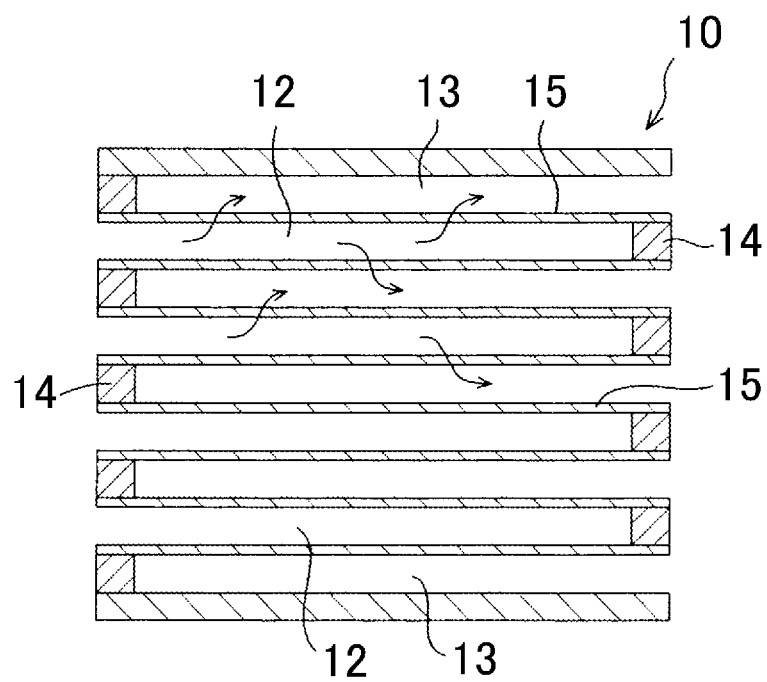
FIG. 5 is a longitudinal sectional view schematically illustrating the filter.

The GPF device 5 includes a filter 10 with a catalyst housed in a filter container. The filter 10 with a catalyst is formed by supporting the second catalyst on a ceramic filter body formed of an inorganic porous material such as cordierite, SiC, $Si_3N_4$, sialon, and $AlTiO3$. As schematically shown in FIGS. 3 to 5, the filter 10 with the catalyst is of a honeycomb structure and includes a multitude of cells 12 and 13 extending in parallel with one another. Inflow side cells 12, whose downstream ends are each blocked by a stopper 14, and outflow side cells 13, whose upstream ends are each blocked by a stopper 14, are alternately provided. The cell 12 and the cell 13 are separated from each other by a thin partition wall (exhaust gas passage wall) 15. In FIG. 3, a reference numeral 11 denotes an exhaust gas passage. Each hatched part in FIG. 4 shows the stopper 14 at an upstream end of an exhaust gas outflow passage 13.

As the filter body, it is preferable to adopt a filter body having a capacity of 1.0 L to 2.0 L, a cell density of 200 cpsi to 300 cpsi, a thickness of each of the partition walls 15 of 150 µm to 250 µm, a porosity of each of the partition walls 15 of 40% to 60%, and a pore volume of each of the partition walls 15 of approximately 70 cm$_3$ to 400 cm$_3$.

As shown in FIG. 5, the exhaust gas flows into the inflow side cells 12 of the filter 10 with the catalyst, passes through the partition walls 15 around the cells 12, and flows out to the outflow side cells 13 which respectively neighbor thereto, as indicated by arrows.

Figure 6:
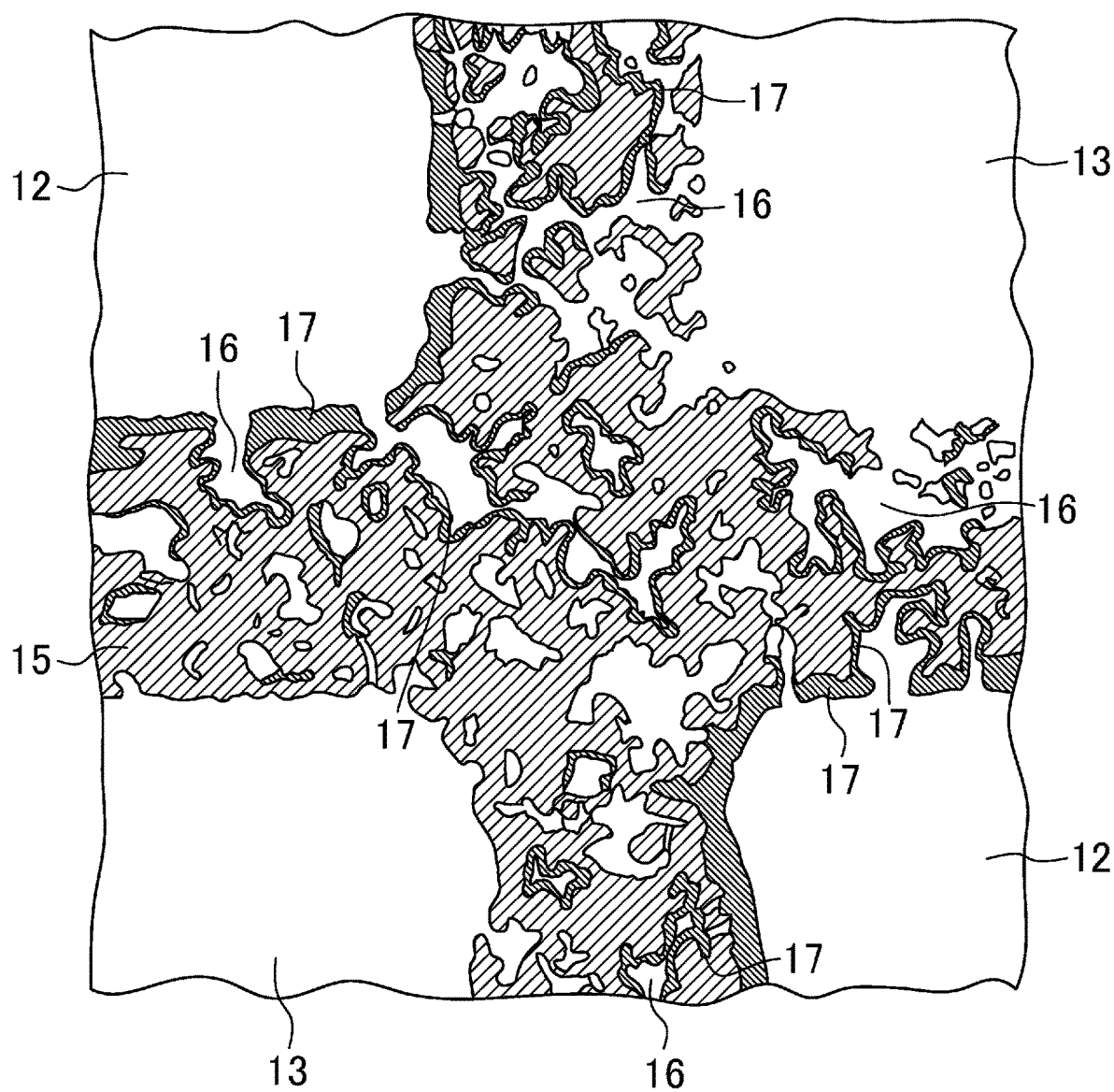
FIG. 6 is a cross sectional view illustrating a part of the filter.

As shown in FIG. 6, each of the partition walls 15 has fine pores 16 for causing the cells 12 and the cells 13 to communicate with each other, and the exhaust gas passes through the pores 16. PM in the exhaust gas adheres mainly to walls of the cells 12 and the pores 16 and is deposited thereon.

The second catalyst 17 is supported on surfaces (filter surfaces) of the partition walls 15 constituting the inflow side cells 12 and on inner surfaces of the pores 16. The second catalyst 17 is supported on the surfaces of the partition walls 15 constituting the cells 12 more thickly than on the inner surfaces of the pores 16. It is preferable that an amount of the supported second catalyst per unit area of the surfaces of the partition walls 15 is 50 times or more and 500 times or less as much as an amount of the supported second catalyst per unit area of the inner surfaces of the pores 16.

In order to achieve the above-mentioned condition, it is only required to support a major amount of a total amount of the catalyst supported on the filter body on the surfaces of the partition walls 15 constituting the inflow side cells 12. It is preferable that 65% or more and 85% or less of the total amount of the supported catalyst is supported on the surfaces of the partition walls 15 constituting the inflow side cells 12.

It is preferable that an amount of the second catalyst supported on the surfaces of the partition walls 15 and the inner surfaces of the pores 16 per L of the filter body is approximately 20 g/L to 100 g/L. It is only required that an amount of the second catalyst supported on the surfaces of the partition walls 15 constituting the inflow side cells 12 is, for example, 15 g/L to 75 g/L of the filter body and an amount of the second catalyst supported on the inner surfaces of the pores 16 is, for example, 0.08 g to 0.37 g per unit pore volume.

First Catalyst and Second Catalyst

As the first catalyst having high activity for purifying the unsaturated high HC, preferable is a catalyst which contains, as an essential component, Pd-supported $La_2O_3$-containing alumina formed by supporting Pd on activated alumina containing 4% by mass of $La_2O_3$, further an OSC material (oxygen storage/release material) such as CeZr-based composite oxide, and an Rh catalyst formed by supporting Rh on the OSC material.

As the second catalyst having high activity for purifying the saturated low HC, preferable is a catalyst which contains, as an essential component, Pt-supported $La_2O_3$-containing alumina formed by supporting Pt on activated alumina containing 4% by mass of $La_2O_3$ and further, the above-mentioned OSC material.

As described above, since the front stage honeycomb catalyst 7 of the catalytic converter 3 contains the first catalyst which is excellent in purifying the unsaturated high HC, the unsaturated high HC in the exhaust gas is oxidized and purified by the first catalyst, and a temperature of the exhaust gas is increased by catalytic reaction heat generated at that time. In accordance therewith, a temperature of the rear stage honeycomb catalyst 8 containing the second catalyst which is excellent in purifying the saturated low HC is increased. Accordingly, the saturated low HC in the exhaust gas is efficiently purified by the second catalyst of the rear stage honeycomb catalyst 8.

Further, a temperature of the exhaust gas is increased by the catalytic reaction heat due to the purification of HC by the honeycomb catalysts 7 and 8, such that the above-mentioned exhaust gas flows into the filter 10 with the catalyst on the downstream side. Therefore, the purification of the saturated low HC by the second catalyst of the filter 10 with the catalyst efficiently proceeds.

Further, saturated low HC is generated by cracking of the unsaturated high HC by the front-stage honeycomb catalyst 7 of the catalytic converter 3, and the saturated low HC flows to the rear stage honeycomb catalyst 8 and the filter 10 with the catalyst. Since the second catalysts of the rear stage honeycomb catalyst 8 and the filter 10 with the catalyst are excellent in purifying the unsaturated low HC, the saturated low HC generated by the above-mentioned cracking is efficiently purified by the second catalysts of the rear stage honeycomb catalyst 8 and the filter 10 with the catalyst.

In the filter 10 with the catalyst, the second catalyst is thickly supported on the surfaces of the partition walls 15 constituting the inflow side cells 12 and is thinly supported on the inner surfaces of the pores 16. Accordingly, since the exhaust gas is actively purified on the surfaces of the partition walls 15, the exhaust gas whose temperature has been increased passes through the pores 16. Therefore, although the second catalyst is thinly supported on the inner surfaces of the pores 16, the temperature of the exhaust gas passing through the pores 16 is high and thus, the purification of the exhaust gas by the second catalyst efficiently proceeds.

Method for Manufacturing Device for Treating Exhaust Gas

Supporting Catalyst on Inner Surfaces of Pores of Filter (First Step)

Figure 7:
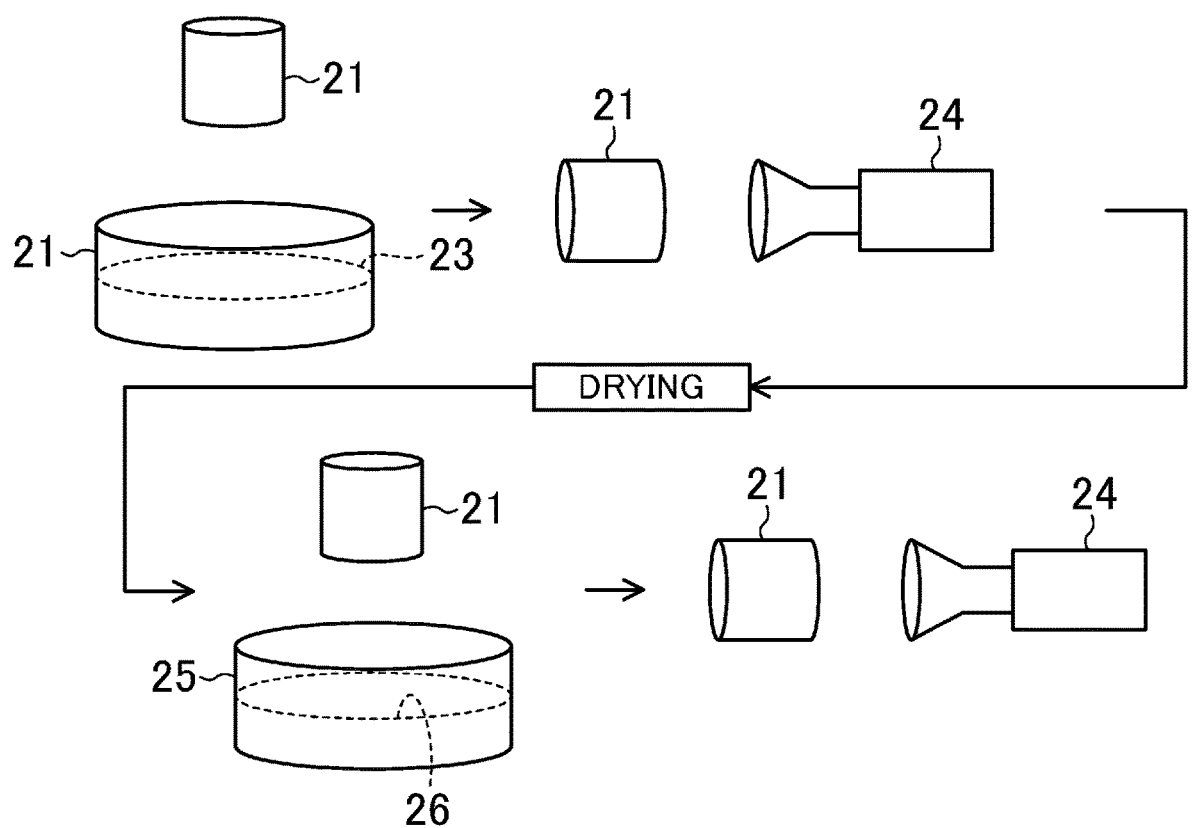
FIG. 7 is a diagram showing steps for manufacturing the filter.

As shown in FIG. 7, one end portion of the filter body (with a catalyst unsupported) 21 is immersed in catalyst slurry 23 of the above-mentioned second catalyst stored in a first container 22 and is pulled up. In the filter body 21, the inflow side cells 12 and the outflow side cells 13 are alternately provided.

An upstream end side of the filter body 21 is immersed in the catalyst slurry 23 and is pulled up. This causes the catalyst slurry 23 to adhere to inner surfaces on an upstream end side of the inflow side cells 12 of the filter body 21.

Subsequently, a vacuum pump 24 is connected to a downstream end of the filter body 21, and the pump 24 is operated to render a pressure of the outflow side cells 13 of the filter body 21 negative. When the pressure of the outflow side cells 13 becomes negative, the catalyst slurry 23 adhering to the upstream end side of the inflow side cells 12 is attracted to downstream sides of the cells 12 and infiltrates into the pores 16 of the partition walls 15. Thus, the catalyst is supported on the inner surfaces of the pores 16 of the filter 21.

Here, the catalyst slurry 23 stored in the first container 22 is adjusted to have a viscosity at which the catalyst slurry 23 easily infiltrates into the pores 16 of the partition walls 15.

Drying

By heating the filter body 21, the catalyst adhering to the inner surfaces of the pores 16 of the partition walls 15 is dried. This drying is conducted, for example, by holding the filter body 21 at a temperature of 150° C. for two hours.

Supporting Catalyst on Surfaces of Partition Walls of Filter (Second Step)

An end portion of the dried filter body 21 on an upstream end side is immersed in catalyst slurry 26 of the above-mentioned second catalyst stored in a second container 25 and is pulled up. This causes the catalyst slurry 26 to adhere to the inner surfaces on an upstream side of the inflow side cells 12 of the filter body 21.

Subsequently, a vacuum pump 24 is connected to a downstream end of the filter body 21, and the pump 24 is operated to render a pressure of the outflow side cells 13 of the filter body 21 negative. When the pressure of the outflow side cell 13 becomes negative, the catalyst slurry 23 adhering to the upstream end side of the inflow side cells 12 is attracted to downstream sides of the cells 12. Thus, the catalyst is supported on the inner surfaces of the inflow side cells 12 of the filter 21, that is, on surfaces of the partition walls 15.

Here, the catalyst slurry 26 stored in the second container 25 is made to have a viscosity higher than that of the catalyst slurry 23 stored in the first container 22 so as to hinder the catalyst slurry 26 from entering the pores 16 of the partition walls 15 upon vacuuming performed by the vacuum pump 24.

When the catalyst slurry 26 is supported on the surfaces of the partition walls 15, although a part of the pores 16 are blocked, the catalyst slurry 26 supported on the surfaces of the partition walls 15 becomes porous catalyst layers by the subsequent calcination, thereby allowing the exhaust gas to pass through the catalyst layers and to flow into the pores 16.

Calcining

By heating the filter body 21 having undergone the second step, the catalyst adhering to the surfaces of the partition walls 15 of the filter body 21 and the catalyst adhering to the inner surfaces of the pores 16 are calcined. This calcining is conducted, for example, by holding the filter body 21 at a temperature of 500° C. for two hours. If necessary, the drying step (in which the filter body 21 is held at the temperature of 150° C. for two hours) is interposed prior to the calcining.

As described above, the filter 10 with the catalyst, in which the second catalyst is supported on the surfaces of the partition walls 15 and the inner surfaces of the pores 16 of the inflow side cells 12 of the filter body 21 is obtained.

Assembly (Third Step)

The GPF device 5 in which the filter 10 with the catalyst is housed in the filter container is connected to the catalytic converter 3 in which the honeycomb catalysts 7 and 8 are housed in the catalyst container, the catalytic converter 3 is connected to the exhaust manifold 2 via a connection pipe 4, and the GPF device 5 is joined to the exhaust pipe 6. Thus, the device for treating exhaust gas from an engine is obtained.

Example and Comparative Example

As the filter body 21, a filter formed of cordierite and having a capacity of 1.3 L was prepared. A cell density thereof was 250 cpsi, a partition wall thickness was 200 μm, a porosity of each of the partition walls was 50%, and a pore volume of each of the partition walls was approximately 100 cm$^3$.

In Example, a filter with a catalyst was obtained by supporting 15 g/L of the second catalyst (the supported amount in the above-mentioned first step) on inner surfaces of pores of the filter body 21 and supporting 45 g/L of the second catalyst (the supported amount in the above-mentioned second step) on surfaces of partition walls constituting inflow side cells 12.

A total area of the surfaces of partition walls constituting the inflow side cells 12 of the filter body 21 was 1.82 m$^2$, and a total area of the inner surfaces of pores of the filter body 21 calculated from the concept of the hydraulic diameter was 258.09 m$^2$. Accordingly, an amount of the supported catalyst per unit area of the surfaces of the partition walls (a filter surface) constituting the inflow side cells 12 was 24.73 g/m$^2$, and an amount of the supported catalyst per unit area of the inner surfaces of the pores was 0.058 g/m$^2$. Therefore, the amount of the supported catalyst per unit area of the surfaces of partition walls constituting the inflow side cells 12 was approximately 426 times as much as the amount of the supported catalyst per unit area of the inner surfaces of the pores.

In Comparative Example, a filter with a catalyst was obtained by supporting 60 g/L of the second catalyst on inner surfaces of pores of the filter body 21. An amount of catalyst supported on surfaces of partition walls constituting inflow side cells 12 was set to zero. An amount of the supported catalyst per unit area of the inner surfaces of the pores was 0.23 g/m$^2$.

Temperature Rise Characteristics

An estimation was made of a temperature of gas flowing into the pores upon flowing a methane gas (with a gas temperature of 300° C. and a CH$_4$ concentration of 160 ppmC at an inlet of the filter) as simulated exhaust gas to the filter with the catalyst in each of Example and Comparative Example.

Figure 8:
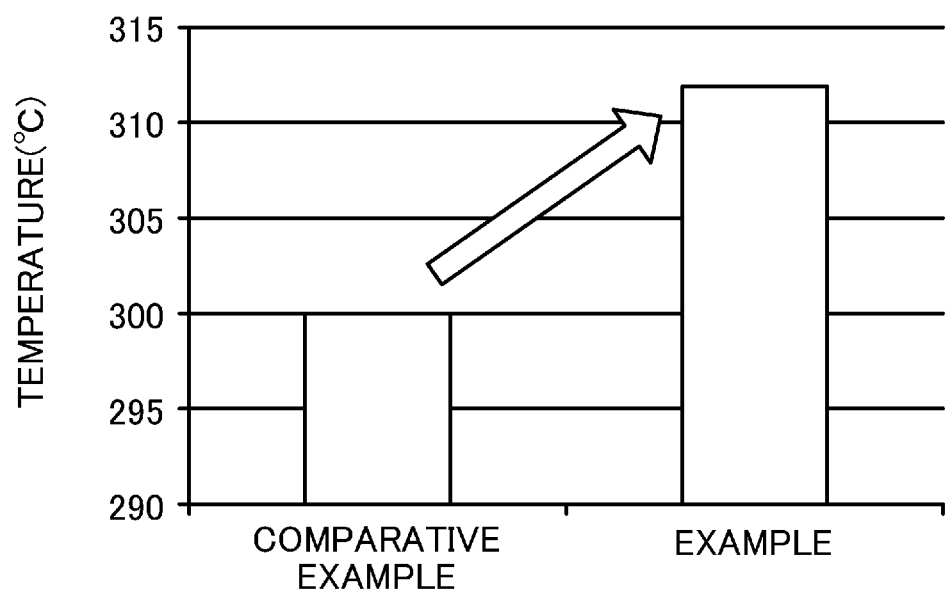
FIG. 8 is a graph showing a difference in temperatures of gas flowing into pores of the filter with the catalyst in Example and Comparative Example.

A total amount of CH$_4$ (0.06 mol) flowing into the filter was determined from a CH$_4$ concentration, a gas flow rate of 10 g/sec., and a gas flowing time of 60 seconds. In the filter in Example, assuming that 75% of the total amount of CH$_4$ was purified by the second catalyst supported on the surfaces of partition walls of the inflow side cells 12, a rising temperature of the gas was determined from a heat capacity of 736 J/kg·K of the filter and a weight of 0.45 kg thereof and the below-mentioned heat of combustion of CH$_4$. In the filter in Comparative Example, a CH$_4$ purification rate in the inflow side cells was zero. The results are shown in Table 1 and FIG. 8.

$$CH_4 + 2O_2 \rightarrow CO_2 + 2H_2O + 891 kJ/mol$$

TABLE 1

| | Comparative Example | Example |
|---|---|---|
| $CH_4$ Concentration at Filter Inlet | 160 ppmC | 160 ppmC |
| $CH_4$ Purification Rate in Inflow Side Cells | 0% | 75% |
| Amount of Heat Generated in Association with $CH_4$ Combustion | 0 | 4009 J |
| Temperature of Gas Flowing into Pores | 300° C. | 312.1° C. |

Table 1 shows that by supporting the catalyst on the surfaces of partition walls constituting the inflow side cells 12 as in Example, the temperature of the exhaust gas flowing into the pores due to the catalytic reaction heat is increased, which is advantageous in purification of the exhaust gas by the catalyst supported on the inner surfaces of pores.

Exhaust Pressure Loss

Amounts of supported catalyst in Example and Comparative Example were the same, 60 g/L. In Comparative Example, a total amount of the catalyst was supported on the inner surfaces of the pores, whereas in Example, the amount of catalyst supported on the inner surfaces of the pores was set to 15 g/L by supporting ¾ of a total amount of the catalyst on the surfaces of partition walls constituting the inflow side cells 12. Therefore, in the filter in Example, a porosity of the partition walls was approximately 5.4% larger than that of the filter in Comparative Example.

Figure 9:
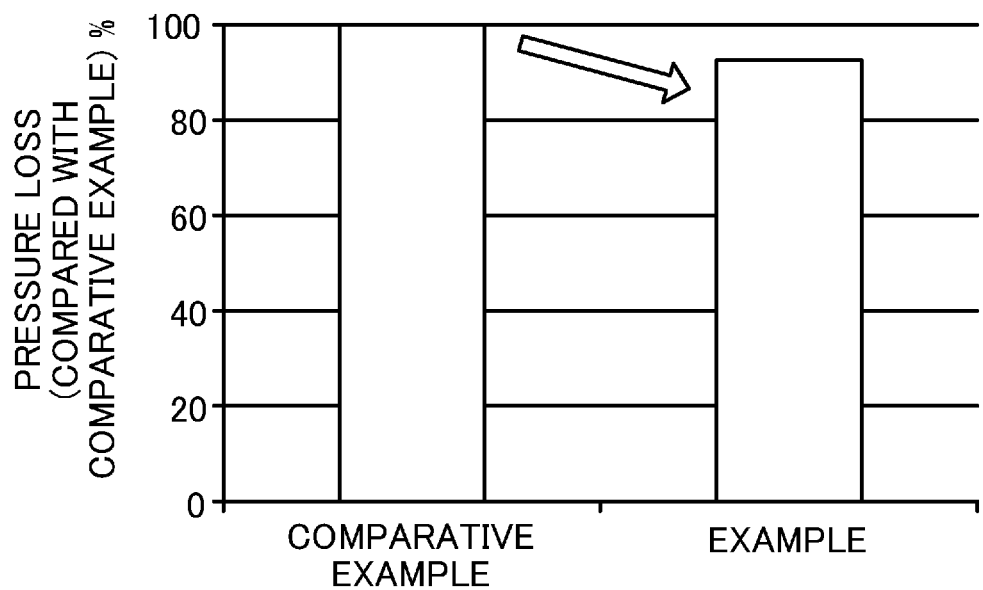
FIG. 9 is a graph showing a rate of decrease in exhaust pressure loss in Example.

Assuming that exhaust pressure loss in an engine due to the filter with the catalyst depended only on the porosity, a rate of decrease in exhaust pressure loss in Example, with exhaust pressure loss in Comparative Example as reference (100%), was calculated. In the calculation, an exhaust gas flow rate was set to 0.15 g/sec., and a temperature of an exhaust gas was set to 550° C. Results are shown in FIG. 9.

The exhaust pressure loss in Example was approximately 93% of that in Comparative Example. This result shows that by supporting a portion of the catalyst on the surfaces of partition walls constituting the inflow side cells 12 as in Example, the exhaust pressure loss becomes small, thereby leading to advantages in enhancing scavenging performance of an engine and thus, in enhancing fuel consumption.

DESCRIPTION OF REFERENCE CHARACTERS

1 Gasoline Engine
2 Exhaust Manifold
3 Catalytic Converter
5 GPF Device
7 Front Stage Honeycomb Catalyst
8 Rear Stage Honeycomb Catalyst
10 Filter with Catalyst
12 Inflow Side Cells
13 Outflow Side Cells
14 Stoppers
15 Partition Walls
16 Pores
17 Second Catalyst

The invention claimed is:

1. A device for treating exhaust gas from an engine, the device comprising
a porous filter provided in an exhaust gas passage of the engine and collecting particulate matter in exhaust gas,
a catalytic converter provided on an upstream side of the filter in the exhaust gas passage and purifying the exhaust gas,
the exhaust gas passing through pores of the filter from surfaces of the filter and being discharged,
a catalyst for purifying the exhaust gas being supported on the surfaces of the filter and inner surfaces of the pores,
the catalyst being supported on the surfaces of the filter more thickly than on the inner surfaces of the pores,
the catalytic converter including a catalyst which exhibits activity in oxidation reaction of unsaturated hydrocarbons whose number of carbon atoms is 6 to 9,
the catalyst of the filter exhibiting activity in oxidation reaction of saturated hydrocarbons whose number of carbon atoms is 5 or smaller,
the catalyst of the catalytic converter producing the saturated hydrocarbons by cracking of the unsaturated hydrocarbons, and
the catalyst of the filter purifying the saturated hydrocarbons.

2. The device for treating exhaust gas from an engine of claim 1, wherein
an amount of the supported catalyst per unit area of the surfaces of the filter is 50 times or more and 500 times or less as much as an amount of the supported catalyst per unit area of the inner surfaces of the pores.

3. A method for manufacturing the device for treating exhaust gas from an engine according to claim 1, the method comprising:
a first step of immersing the porous filter in a first catalyst slurry in which the catalyst for purifying the exhaust gas is dispersed, and of supporting the catalyst on inner surfaces of the pores of the porous filter, the porous filter having the pores through which the exhaust gas from the engine passes;
a second step of immersing the porous filter having undergone the first step in a second catalyst slurry in which the catalyst is dispersed and of supporting the catalyst on surfaces of the porous filter in a thickness greater than a thickness of the catalyst supported on the inner surfaces of the pores of the porous filter; and
a third step of providing the porous filter having undergone the second step in an exhaust gas passage of the engine.

4. The method for manufacturing a device for treating exhaust gas from an engine of claim 3, the method further comprising:
a step of drying the catalyst supported on the inner surfaces of the pores of the porous filter between the first step and the second step, and
a step of calcining the catalyst supported on the surfaces of the porous filter and the catalyst supported on the inner surfaces of the pores between the second step and the third step.

5. The method for manufacturing a device for treating exhaust gas from an engine of claim 3, wherein
components of the catalyst of the first catalyst slurry and components of the catalyst of the second catalyst slurry are same as each other.

6. The method for manufacturing a device for treating exhaust gas from an engine of claim 5, the method further comprising:
a step of drying the catalyst supported on the inner surfaces of the pores of the porous filter between the first step and the second step, and a step of calcining the catalyst supported on the surfaces of the porous filter and the catalyst supported on the inner surfaces of the pores between the second step and the third step.

7. A device for treating exhaust gas from an engine, the device comprising a catalytic converter provided in an exhaust gas passage of an engine; and a filter device provided on a downstream side of the catalytic converter in the exhaust gas passage, the catalytic converter includes a catalyst on a front stage that includes a first catalyst which exhibits activity in oxidation reaction of unsaturated hydrocarbons whose number of carbon atoms is 6 to 9, a catalyst on a rear stage that is provided on a downstream side of the catalyst on the front stage and includes a second catalyst which exhibits activity in oxidation reaction of saturated hydrocarbons whose number of carbon atoms is 5 or smaller, and a catalyst container housing the catalyst on the front stage and the catalyst on the rear stage together, the filter device including a filter porous and collecting particulate matter in exhaust gas and a filter container housing the porous filter, the exhaust gas passing through pores of the filter from surfaces of the filter and being discharged, the catalytic converter being connected to an exhaust manifold of the engine via a connecting pipe, the filter device being directly connected to the catalytic converter, a catalyst being supported on the surfaces of the filter and inner surfaces of the pores exhibiting activity in oxidation reaction of saturated hydrocarbons whose number of carbon atoms is 5 or smaller, the catalyst of the filter device being supported on the surfaces of the filter more thickly than on the inner surfaces of the pores, the first catalyst of the catalytic converter producing the saturated hydrocarbons by cracking of the unsaturated hydrocarbons, and the second catalyst of the catalytic converter and the catalyst of the filter purifying the saturated hydrocarbons.

* * * * *